US009929604B2

(12) United States Patent
Watanabe et al.

(10) Patent No.: US 9,929,604 B2
(45) Date of Patent: Mar. 27, 2018

(54) APPARATUS AND METHOD FOR WIRELESS POWER TRANSMISSION (71) Applicant: ROHM CO., LTD., Ukyo-Ku, Kyoto (JP)

(72) Inventors: Masatoshi Watanabe, Kyoto (JP); Tomoya Morinaga, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 156 days.

(21) Appl. No.: 14/980,760

(22) Filed: Dec. 28, 2015

(65) Prior Publication Data

US 2016/0134129 A1    May 12, 2016

Related U.S. Application Data (63) Continuation of application No. PCT/JP2014/002759, filed on May 26, 2014.

(30) Foreign Application Priority Data

Jun. 25, 2013  (JP) .................................. 2013-133088

(51) Int. Cl.
H01F 27/42 (2006.01)
H02J 50/60 (2016.01)
(Continued)

(52) U.S. Cl.
CPC ............. H02J 50/60 (2016.02); H02J 5/005 (2013.01); H02J 7/025 (2013.01); H02J 17/00 (2013.01);
(Continued)

(58) Field of Classification Search
CPC ....................................................... H02J 5/005
(Continued)

(56) References Cited

U.S. PATENT DOCUMENTS

| | | | | |
|---|---|---|---|---|
| 2009/0015197 A1* | 1/2009 | Sogabe | ................. | H02J 7/0011 320/108 |
| 2012/0043818 A1* | 2/2012 | Stratakos | ................ | H02J 3/383 307/77 |
| 2012/0326662 A1* | 12/2012 | Matsumoto | ............. | H02J 7/025 320/108 |

FOREIGN PATENT DOCUMENTS

| | | |
|---|---|---|
| CN | 101345437 A | 1/2009 |
| JP | 2013005682 A | 1/2013 |

(Continued)

OTHER PUBLICATIONS

Taiwanese Office Action corresponding to Application No. 103120369; dated Sep. 6, 2017.
(Continued)

*Primary Examiner* — Thomas Skibinski
(74) *Attorney, Agent, or Firm* — Cantor Colburn LLP (57) ABSTRACT

A transmission antenna includes a transmission coil, and transmits an electric power signal. A driver applies a driving signal to the transmission antenna. A first temperature sensor measures the temperature of the transmission coil, and generates a first temperature signal. A second temperature sensor measures the temperature of an interface surface on which an electronic device mounting a wireless power receiving apparatus is to be placed, and generates a second temperature signal. A control circuit controls the electric power signal according to the difference between the first temperature signal S11 and the second temperature signal.

4 Claims, 4 Drawing Sheets

(51) Int. Cl.
| | |
|---|---|
| *H02J 50/12* | (2016.01) |
| *H02J 50/90* | (2016.01) |
| *H02J 17/00* | (2006.01) |
| *H02J 7/02* | (2016.01) |
| *H02J 5/00* | (2016.01) |
| *H02M 1/32* | (2007.01) |
| *H02J 50/10* | (2016.01) |

(52) U.S. Cl.
CPC .............. *H02J 50/10* (2016.02); *H02J 50/12* (2016.02); *H02J 50/90* (2016.02); *H02M 1/32* (2013.01)

(58) Field of Classification Search
USPC .................................. 307/104; 320/107, 108
See application file for complete search history.

(56) References Cited

FOREIGN PATENT DOCUMENTS

| JP | 2013059236 A | 3/2013 |
|---|---|---|
| TW | M447036 U1 | 2/2013 |

OTHER PUBLICATIONS

First Office Action for corresponding Chinese Application No. 201480036098.4; dated Jun. 28, 2017.

\* cited by examiner

APPARATUS AND METHOD FOR WIRELESS POWER TRANSMISSION

CROSS-REFERENCE TO RELATED APPLICATIONS

This application is a continuation under 35 U.S.C. § 120 of PCT/JP2014/002759, filed May 26, 2014, which is incorporated herein reference and which claimed priority to Japanese Application No. 2013-133088, filed Jun. 25, 2013. The present application likewise claims priority under 35 U.S.C. § 119 to Japanese Application No. 2013-133088, filed Jun. 25, 2013, the entire content of which is also incorporated herein by reference.

BACKGROUND OF THE INVENTION

1. Field of the Invention

The present invention relates to a wireless power supply technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

Figure 1:
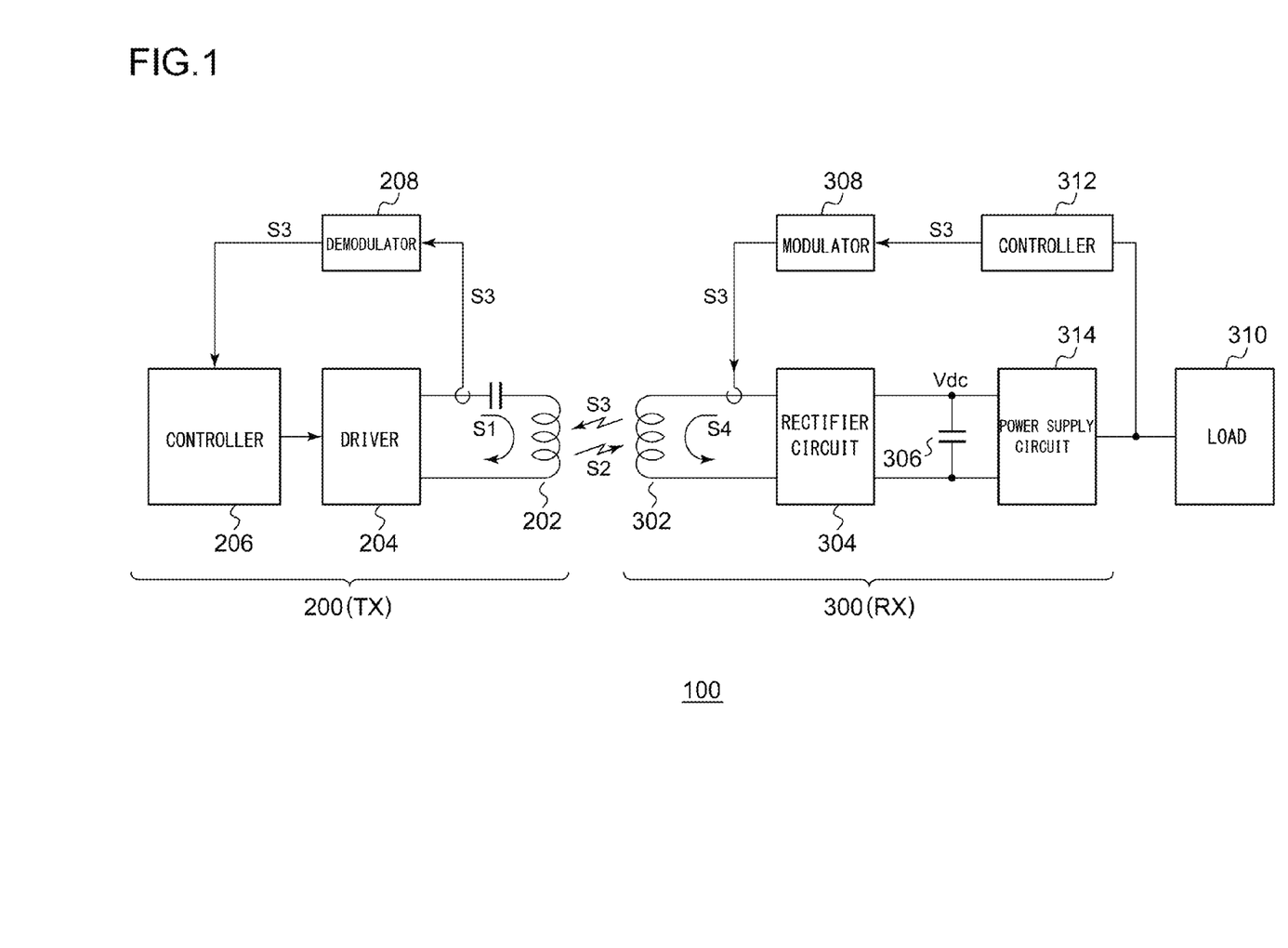
FIG. 1 is a diagram showing a configuration of a wireless power supply system that conforms to the Qi standard.

FIG. 1 is a diagram showing a configuration of a wireless power supply system 100 that conforms to the Qi standard. The power supply system 100 includes a power transmission apparatus 200 (TX) and a power receiving apparatus 300 (RX). The power receiving apparatus 300 is mounted on an electronic device, examples of which include cellular phone terminals, smartphones, audio players, game machines, and tablet terminals.

The power transmission apparatus 200 includes a transmission coil 202 (primary coil), a driver 204, a controller 206, and a demodulator 208. The driver 204 includes an H-bridge circuit (full-bridge) circuit or otherwise a half-bridge circuit. The driver 204 applies a driving signal S1, configured as a driving current or otherwise a driving voltage, for example, to the transmission coil 202 such that an electric power signal S2 is generated at the transmission coil 202 in the form of an electromagnetic signal. The controller 206 integrally controls the overall operation of the power transmission apparatus 200. Specifically, the controller 206 controls the switching frequency of the driver 204 or otherwise the duty ratio of the switching of the driver 204 so as to adjust the electric power to be transmitted.

In the Qi standard, a protocol is defined for communication between the power transmission apparatus 200 and the power receiving apparatus 300, which enables information transmission from the power receiving apparatus 300 to the power transmission apparatus 200 via a control signal S3. The control signal S3 is transmitted from a reception coil 302 (secondary coil) to the transmission coil 202 in the form of an AM (Amplitude Modulation) modulated signal using backscatter modulation. The control signal S3 includes electric power control data (which will also be referred to as a "packet") which indicates an amount of electric power to be supplied to the power receiving apparatus 300, and data which indicates the particular information for identifying the power receiving apparatus 300. The demodulator 208 demodulates the control signal S3 included in the current or otherwise the voltage applied to the transmission coil 202. The controller 206 controls the driver 204 based on the power control data included in the control signal S3 thus demodulated.

The power receiving apparatus 300 includes the reception coil 302, a rectifier circuit 304, a capacitor 306, a modulator 308, a load circuit 310, a controller 312, and a power supply circuit 314. The reception coil 302 receives the electric power signal S2 from the transmission coil 202, and transmits the control signal S3 to the transmission coil 202. The rectifier circuit 304 and the capacitor 306 rectify and smooth a current S4 induced at the reception coil 302 according to the electric power signal S2, thereby converting the current S4 into a DC voltage.

Using electric power supplied from the power transmission apparatus 200, the power supply circuit 314 charges an unshown secondary battery or steps up or otherwise steps down the DC voltage Vdc, so as to supply the DC voltage to the controller 312 and other load circuits 310.

The controller 312 monitors the amount of electric power supplied to the power receiving apparatus 300, and accordingly generates electric power control data which indicates the amount of power transmission. The modulator 308 modulates the control signal S3 including the electric power control data so as to modulate the coil current that flows through the reception coil 302, thereby modulating the coil current and coil voltage applied to the transmission coil 202.

A state can occur in which there is an electro-conductive foreign object such as a piece of metal or the like between, or otherwise in the vicinity of, the transmission coil 202 and the reception coil 302. In a case in which wireless power supply is performed in this state, a current flows through the foreign object, leading to power loss. Also, such a case leads to a problem of the foreign object heating up. In view of such a situation, foreign object detection (FOD) has been designed according to the WPC1.1 (System Description Wireless Power Transfer Volume I: Low Power Part 1: Interface Definition Version 1.1) specification.

In such FOD, the electric power transmitted by the power transmission apparatus 200 is compared with the electric power received by the power receiving apparatus 300. When the difference between them is greater than an allowable value, judgement is made that a foreign object exists.

SUMMARY OF THE INVENTION

However, the present inventors have investigated such an arrangement, and have found that, in some cases, false detection of a foreign object is made by means of the FOD function even if there is no foreign object. This is because the transmitted electric power to be compared is a measurement value, and the received electric power to be compared is an estimated value on the assumption that the transmission coil and the reception coil are coupled with a predetermined coupling coefficient configured as a typical value. Specifically, this is because of (i) irregularity in the coupling coefficient that occurs in actuality, and (ii) error in the measurement values of the electric power measured at the power transmission apparatus 200 and the power receiving apparatus 300.

Accordingly, in a case of employing the FOD function alone, such an arrangement is not capable of distinguishing foreign object detection from misalignment between the transmission coil and the reception coil. That is to say, if there is a very small misalignment between the transmission coil and the reception coil, this leads to false detection of a foreign object even if no foreign object exists.

The present invention has been made in order to solve such a problem. Accordingly, it is an exemplary purpose of an embodiment of the present invention to provide a power transmission apparatus that is capable of detecting misalignment between the transmission coil and the reception coil.

An embodiment of the present invention relates to a wireless power transmission apparatus. The wireless power transmission apparatus comprises: a transmission antenna that comprises a transmission coil, and that transmits an electric power signal; a driver that applies a driving signal to the transmission antenna; a first temperature sensor that measures a temperature of the transmission coil, and that generates a first temperature signal; a second temperature sensor that measures a temperature of an interface surface on which an electronic device mounting a wireless power receiving apparatus is to be placed, and that generates a second temperature signal; and a control circuit that controls the driver, and that controls the electric power signal according to a difference between the first temperature signal and the second temperature signal.

When there is a foreign object such as a piece of metal or the like on the interface surface, the foreign object heats up, leading to an increase in the temperature of the interface surface. In contrast, when position misalignment occurs and there is no foreign object, this leads to only a small increase in the temperature of the interface surface. With such an embodiment, by detecting the temperature difference between the interface surface and the transmission coil, such an arrangement is capable of detecting position misalignment.

Also, when the aforementioned difference is greater than a first threshold value, electric power transmission may be limited.

Examples of "limiting electric power transmission" include: setting the electric power to be transmitted to zero; reducing the electric power to be transmitted; and the like.

Also, the control circuit may be capable of detecting a foreign object on or above the interface surface. Also, when judgment is made that the foreign object exists, and when the aforementioned difference is greater than a second threshold value, electric power transmission may be limited. Also, when the aforementioned difference is smaller than the second threshold value, electric power transmission is substantially maintained even if judgment has been made that the foreign object exists.

That is to say, when there is only a small temperature difference between the transmission coil and the interface surface, there is a high possibility of such an arrangement leading to false detection of a foreign object due to position misalignment even if judgment has been made, by means of the FOD function, that the foreign object exists. In order to solve such a problem, by comparing the temperature difference with the second threshold value, such an arrangement is capable of distinguishing between position misalignment and foreign object detection.

The first threshold value and the second threshold value may be configured as the same value or otherwise as different values.

Also, when at least one from among the first temperature signal and the second temperature signal is greater than a thermal shutdown threshold value, electric power transmission may be limited.

Such an arrangement is capable of protecting the power transmission apparatus 200 and the power receiving apparatus 300 in a case in which an overheat state occurs in the power transmission apparatus 200 regardless of the cause thereof.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 2:
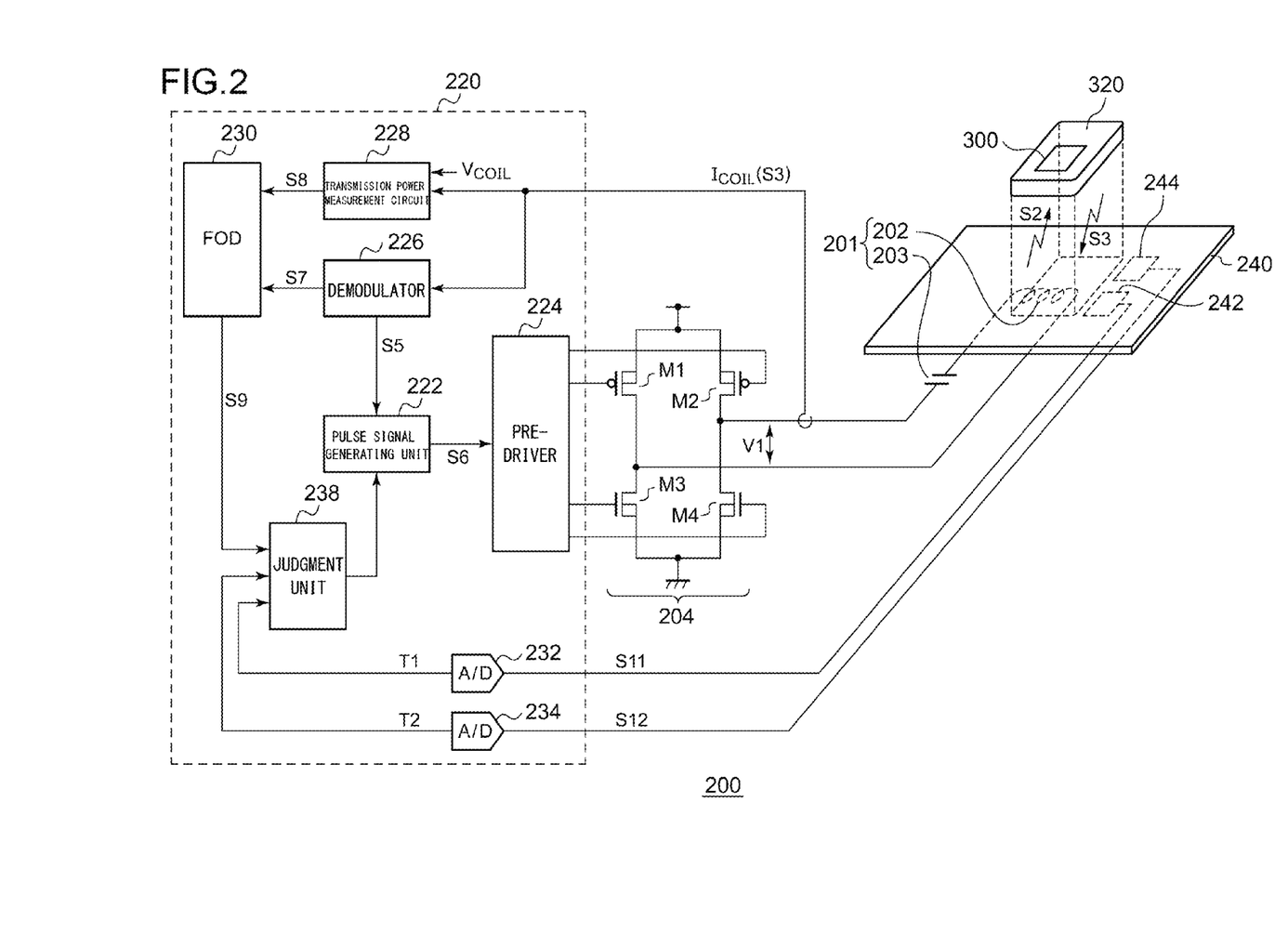
FIG. 2 is a circuit diagram showing a configuration of a wireless power transmission apparatus according to an embodiment.

FIG. 2 is a circuit diagram showing a wireless power transmission apparatus (which will simply be referred to as the "power transmission apparatus" hereafter) 200 according to an embodiment. The power transmission apparatus 200 is employed in the power supply system 100 shown in FIG. 1. The power transmission apparatus 200 supplies an electric power signal S2 to a power receiving apparatus 300 built into an electronic device 320.

The power transmission apparatus 200 includes a transmission antenna 201, a driver 204, a control circuit 220, an interface surface 240, a first temperature sensor 242, and a second temperature sensor 244.

The transmission antenna 201 includes a transmission coil (primary coil) 202 and a resonance capacitor 203 connected in series. The transmission antenna 201 has a predetermined resonance frequency fr.

The driver 204 is configured as an H-bridge circuit including transistors M1 through M4. The driver 204 applies a driving signal S1, configured as a pulse signal having a frequency in the vicinity of the resonance frequency fr, across both ends of the transmission antenna 201. The driver 204 may be configured as a half-bridge circuit.

The electronic device 320 mounting the wireless power receiving apparatus 300 is placed on the interface surface 240.

The first temperature sensor 242 measures the temperature T1 of the transmission coil 202, and generates a first temperature signal S11. The second temperature sensor 244 measures the temperature T2 of the interface surface 240, and generates a second temperature signal S12. Such temperature sensors are not particularly restricted in kind. Such temperature sensors may each be configured as a thermocouple element, a thermistor, or the like.

The control circuit 220 is configured as a function IC (Integrated Circuit) monolithically integrated on a single semiconductor substrate. The control circuit 220 controls the driver 204.

The control circuit 220 includes a pulse signal generating unit 222, a pre-driver 224, a demodulator 226, a transmission power measurement unit 228, a foreign object detection unit 230, an A/D converter 232, an A/D converter 234, a subtractor 236, and a judgment unit 238.

The demodulator 226 demodulates a control signal S3 included in a coil current $I_{COIL}$ that flows through the transmission coil 202 or otherwise a coil voltage $V_C$=across both ends of the transmission coil 202. The control signal S3 includes: power control data S5 which indicates electric power to be transmitted; received power data S7 which indicates the amount of electric power received by the power receiving apparatus 300 at the current time point; particular data with respect to the power receiving apparatus 300; and the like. The received power data S7 is input to the foreign object detection unit 230.

The pulse signal generating unit 222 generates, based on the power control data S5, a pulse signal S6 configured as an instruction to turn on and off the transistors M1 through M4. The pre-driver 224 switches on and off the transistors M1 through M4 of the driver 204 according to the pulse signal S6.

The transmitted electric power is adjusted based on the frequency of the driving signal S1 applied by the driver 204 to the transmission coil 202, i.e., the frequency of the pulse signal S6. Specifically, as the frequency of the pules signal S6 approaches the resonance frequency of the antenna including the transmission coil 202, the transmitted electric power increases. Conversely, as the distance between them becomes greater, the transmitted electric power decreases. That is to say, the pulse signal generating unit 222 adjusts the frequency of the pulse signal S6 based on the power control data S5.

The transmission power measurement unit 228 calculates the transmitted electric power, which represents the electric power transmitted from the transmission antenna 201 to the power receiving apparatus 300, and generates transmitted power data S8. For example, the transmission power measurement unit 228 generates the transmitted power data S8 based on the product of the coil current $I_{COIL}$ and the coil voltage $V_{COIL}$. The foreign object detection unit 230 judges the presence or absence of a foreign object based on the relation between the received power data S7 and the transmitted power data S8. When a foreign object is detected, the foreign object detection unit 230 asserts (set to high level, for example) a foreign object detection (FOD) signal S9. Such a function is referred to as the "FOD function".

The AD converters 232 and 234 respectively convert the first temperature signal S11 and the second temperature signal S12 into digital values. The judgment unit 238 detects whether or not a foreign object exists, and whether or not there is misalignment with respect to the electronic device 320, based on the first temperature T1 represented by the first temperature signal S11, the second temperature T2 represented by the second temperature signal S12 and the FOD signal S9.

Specifically, the judgment unit 238 controls the electric power signal S2 based on the temperature difference $\Delta T = T1 - T2$ obtained based on the first temperature signal S11 and the second temperature signal S12. The judgment unit 238 compares the temperature difference $\Delta T$ with a first threshold value $T_{TH1}$. When the temperature difference $\Delta T$ is greater than the first threshold value $T_{TH1}$, the judgment unit 238 instructs the pulse signal generating unit 222 (and/or the pre-driver 224) to suspend or otherwise reduce the electric power signal S2, thereby limiting power transmission.

Furthermore, when the FOD signal S9 is asserted and the difference $\Delta T$ is greater than a second threshold value $T_{TH2}$, the judgment unit 238 instructs the pulse signal generating unit 222 (and/or the pre-driver 224) to suspend or otherwise reduce the electric power signal S2, thereby limiting power transmission. When the difference $\Delta T$ is smaller than the second threshold value $T_{TH2}$, and the FOD signal S9 is asserted, the transmitted electric power is maintained, or otherwise the transmitted electric power is slightly reduced. That is to say, power transmission is substantially continued.

Furthermore, the judgment unit 238 is configured to provide a thermal shutdown function. When the temperature T1 is higher than a third threshold $T_{SD1}$, or otherwise when the temperature T2 is higher than a fourth threshold value $T_{SD2}$, the judgment unit 238 instructs the pulse signal generating unit 222 (and/or the pre-driver 224) to suspend or otherwise reduce the electric power signal S2, thereby limiting power transmission, regardless of whether or not a foreign object exists and regardless of whether or not there is position misalignment.

The above is the configuration of the power transmission apparatus 200.

Figure 3:
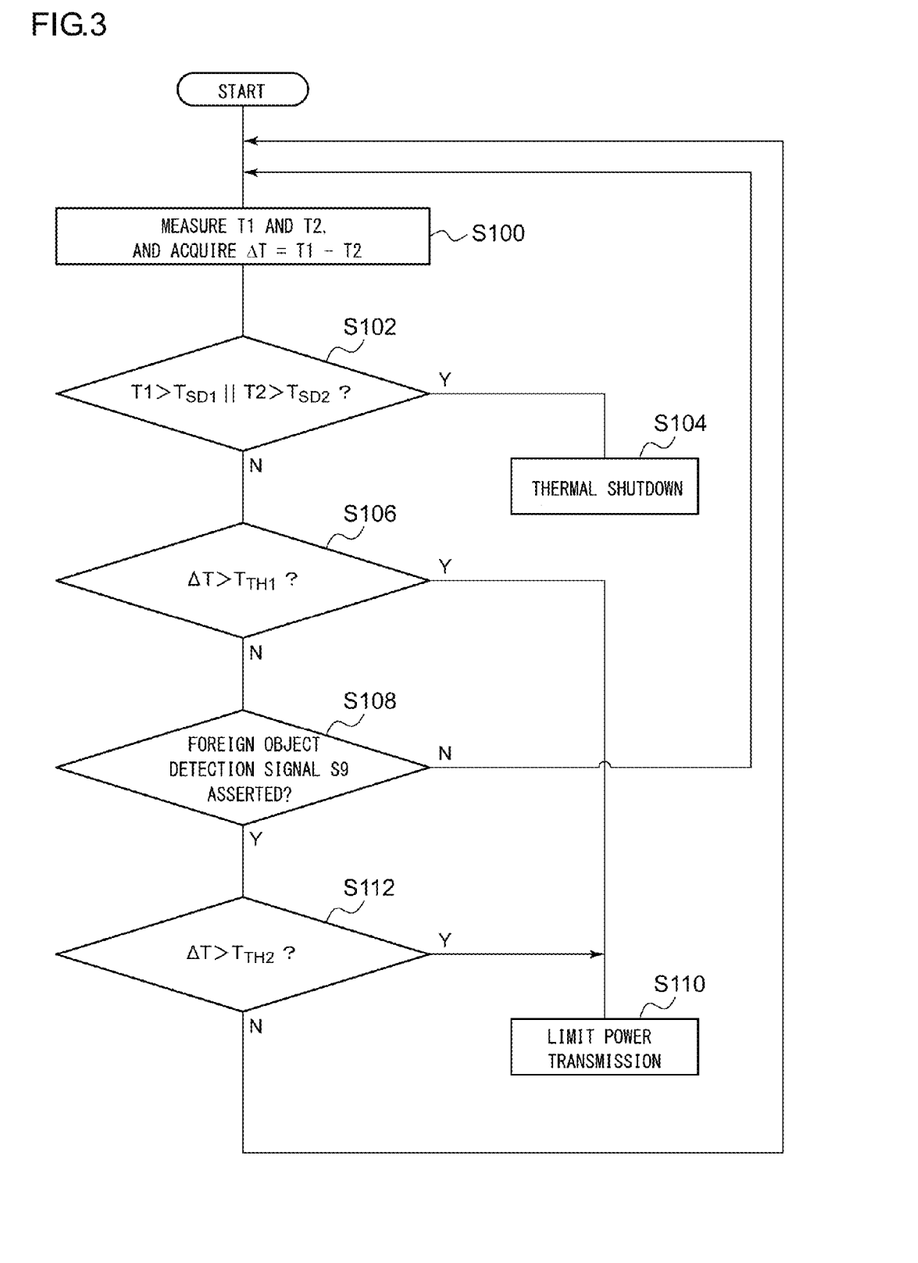
FIG. 3 is a flowchart showing an electric power control operation of the power transmission apparatus shown in FIG. 2 based on the foreign object detection and the position misalignment detection.

FIG. 3 is a flowchart showing an electric power control operation of the power transmission apparatus 200 shown in FIG. 2 based on the foreign object detection and the position misalignment detection.

The judgment unit 238 acquires the temperature T1 of the transmission coil 202 and the temperature T2 of the interface surface 240, and calculates the temperature difference $\Delta T = T1 - T2$ (S100).

When the relation $T1 > T_{SD1}$ or the relation $T2 > T_{SD2}$ holds true (YES in S102), the judgment unit 238 performs a thermal shutdown operation for the power transmission apparatus 200, thereby suspending power transmission (S104).

When the temperature T1 does not reach its thermal shutdown threshold value $T_{SD1}$ and the temperature T2 does not reach its thermal shutdown threshold value $T_{SD2}$ (NO in S102), the temperature difference $\Delta T$ is compared with the threshold value $T_{TH1}$. When the relation $\Delta T > T_{TH1}$ holds true (YES in S106), there is a high possibility that any foreign object exist on or above the interface surface 240. Thus, in this case, power transmission is limited (S110).

When the relation $\Delta T < T_{TH1}$ holds true (NO in S106), a foreign object detection operation is executed based on the FOD function (S108). Specifically, when the FOD signal S9 is not asserted (NO in S108), the flow returns to Step S100.

When the FOD signal S9 is asserted (YES in S108), the temperature difference $\Delta T$ is compared with $T_{TH2}$ (S112). When the relation $\Delta T > T_{TH2}$ holds true (YES in S112), there is a high possibility that a foreign object exists on the interface surface 240. Thus, in this case, power transmission is limited (S110). When the relation $\Delta T < T_{TH2}$ holds true (NO in S112), there is a high possibility that no foreign object exists even if the FOD signal S9 is asserted, and that there is position misalignment between the transmission coil and the reception coil. Thus, in this case, the flow returns to Step S100, and the monitoring is continued.

Figure 4A:
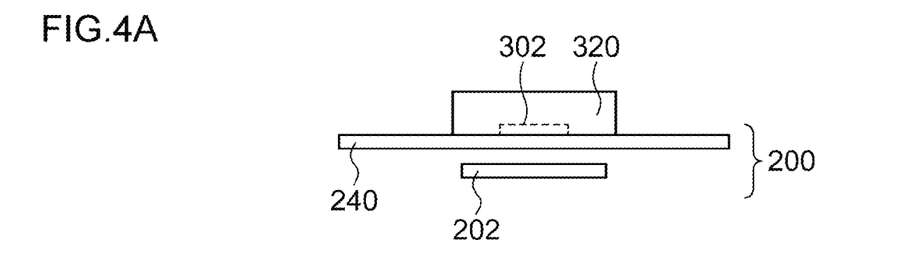
FIGS. 4A through 4C are diagrams each showing the position relation between an interface surface and an electronic device.
Figure 4B:
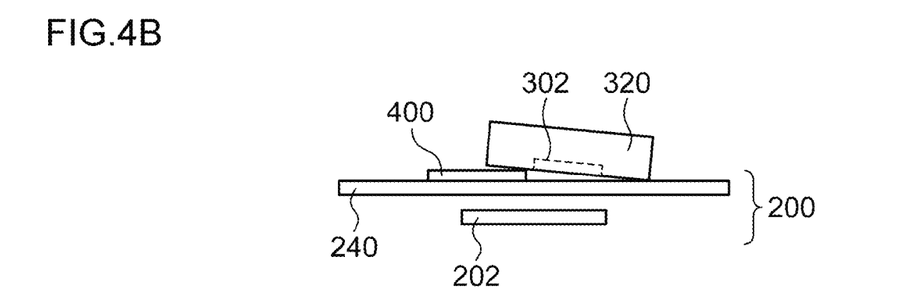
Figure 4C:
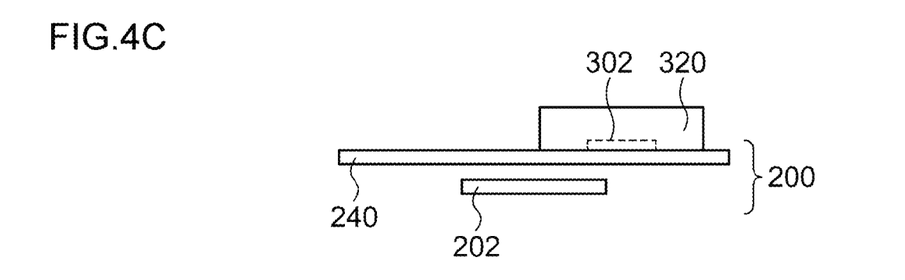

FIGS. 4A through 4C are diagrams each showing the position relation between the interface surface 240 and the electronic device 320. FIG. 4A shows a case in which the electronic device 320 is properly placed on the interface surface 240. In this case, there is only a small temperature difference $\Delta T$ between the temperature T1 of the transmission coil 202 and the temperature T2 of the interface surface 240. Furthermore, the FOD signal S9 is not asserted. Thus, in this case, the electronic device 320 is charged according to a normal feedback control operation.

FIG. 4B shows a case in which there is an electroconductive foreign object 400 on the interface surface 240 in addition to the electronic device 320. In this case, the foreign object 400 is electrically coupled with the transmission coil 202, and a current flows through the foreign object 400 due to electromagnetic induction, leading to the foreign object 400 heating up. In this state, the electric power transmitted from the power transmission apparatus 200 is represented by the sum of the power consumed by the foreign object 400 and the electric power received by the electronic device 320. Accordingly, in this case, there is a great difference between the received power data S7 and the transmitted power data S8 each acquired by the power transmission apparatus 200, and the FOD signal S9 is asserted. Furthermore, the heat of the foreign object 400 propagates to the interface surface 240, leading to an increase in the temperature T2 of the interface surface 240. Eventually, the temperature difference $\Delta T$ exceeds the threshold value $T_{TH2}$, and the power transmission is limited.

FIG. 4C shows a case in which there is no foreign object 400 on the interface surface 240, and there is position misalignment between the electronic device 320 and the transmission coil 202. In this case, the transmission coil 202 and the reception coil 302 electrically couple with a coupling coefficient that is smaller than an expected value as estimated in the state shown in FIG. 4A. Accordingly, in this case, there is a great difference between the received power data S7 acquired by the power transmission apparatus 200 and the electric power actually received by the electronic device 320. In this case, the judgment unit 238 asserts the FOD signal S9. However, in this state, the temperature difference $\Delta T$ is smaller than the second threshold value $T_{TH2}$. Thus, in this case, the power transmission is not limited. That is to say, the power transmission is maintained.

Description will be made returning to FIG. 4A. In a case in which there are large irregularities in the circuit components mounted on the power receiving apparatus 300, this leads to increased error in the received power data S7 or the transmitted power data S8. There is a possibility of this leading to false detection of a foreign object by means of the FOD function, and accordingly, the FOD signal S9 is asserted even in a state as shown in FIG. 4A. It should be noted that, even in this case, the temperature difference $\Delta T$ is smaller than the second threshold value $T_{TH2}$, and accordingly, normal power transmission is maintained.

The above is the operation of the power transmission apparatus 200.

With the power transmission apparatus 200 according to the embodiment, by detecting the temperature difference $\Delta T$ between the interface surface 240 and the transmission coil 202, such an arrangement is capable of detecting position misalignment.

For example, there is a possibility of the FOD function leading to false detection due to position misalignment. With the power transmission apparatus 200 according to the embodiment, by comparing the temperature difference $\Delta T$ with the second threshold value $T_{TH2}$, such an arrangement is capable of distinguishing between position misalignment and foreign object detection.

Furthermore, by comparing the temperatures T1 and T2 with the thermal shutdown thresholds $T_{SD1}$ and $T_{SD2}$, respectively, such an arrangement is capable of protecting the power transmission apparatus 200 and the power receiving apparatus 300 in a case in which an overheat state occurs in the power transmission apparatus 200 regardless of the cause thereof.

Moreover, by allowing the thresholds $T_{TH1}$, $T_{TH2}$, $T_{SD1}$, and $T_{SD2}$ to be independently set, such an arrangement is capable of appropriately detecting each state.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which each of the A/D converters 232 and 234 converts a temperature signal to a digital value. However, the present invention is not restricted to such an arrangement. Also, the judgment unit 238 may be configured as a combination of analog circuits. More specifically, the judgment unit 238 may be configured as a combination of an analog subtractor and a voltage comparator.

Description has been made in the embodiment regarding a wireless power transmission apparatus that conforms to the Qi standard. The present invention is not restricted to such an arrangement. Also, the present invention is applicable to a wireless power transmission apparatus employed in a system that resembles the Qi standard. Also, the present invention is applicable to a power transmission apparatus 200 that conforms to a standard which will be developed in the future.

While the preferred embodiments of the present invention have been described using specific terms, such description is for illustrative purposes only, and it is to be understood that changes and variations may be made without departing from the spirit or scope of the appended claims.

What is claimed is:

1. A wireless power transmission apparatus comprising:
   a transmission antenna that comprises a transmission coil, and that transmits an electric power signal;
   a driver structured to apply a driving signal to the transmission antenna;

a first temperature sensor structured to measure a temperature of the transmission coil, and to generate a first temperature signal;
a second temperature sensor structured to measure a temperature of an interface surface on which an electronic device mounting a wireless power receiving apparatus is to be placed, and to generate a second temperature signal; and
a control circuit structured to control the driver,
wherein the control circuit comprises a foreign object detector structured to detect a foreign object on the interface surface based on a power difference between an electric power transmitted by the wireless power transmission apparatus and an electric power received by the wireless power receiving apparatus, and
wherein the control circuit is structured to:
(i) limit the electric power signal when the temperature difference is greater than a first threshold value;
(ii) limit the electric power signal when the temperature difference is greater than a second threshold value being lower than the first threshold value and an judgment has been made that foreign object exists; and
(iii) substantially maintain the electric power signal when the temperature difference is smaller than the second threshold value even if the judgment has been made that the foreign object exists.

2. The wireless power transmission apparatus according to claim 1, wherein, when at least one from among the first temperature signal and the second temperature signal is greater than a thermal shutdown threshold value, electric power transmission is limited.

3. A control method for a wireless power transmission apparatus, the control method comprising:

a driver applying a driving signal based on a pulse signal to a transmission antenna comprising a transmission coil;
the transmission antenna transmitting an electric power signal according to the pulse signal;
measuring a temperature of the transmission coil, and generating a first temperature signal;
measuring a temperature of an interface surface on which an electronic device mounting a wireless power receiving apparatus is to be placed, and generating a second temperature signal;
detecting a temperature difference between the first temperature signal and the second temperature signal;
limiting the electric power signal when the temperature difference is greater than a first threshold value;
limiting the electric power signal when the temperature difference is greater than a second threshold value being lower than the first threshold value and an judgment has been made that foreign object exists; and
substantially maintaining the electric power signal when the temperature difference is smaller than the second threshold value even if the judgment has been made that the foreign object exists.

4. The control method according to claim 3, wherein the controlling of the driver comprises:
comparing at least one from among the first temperature signal and the second temperature signal with a third threshold value for thermal shutdown; and
limiting electric power transmission when at least one from among the first temperature signal and the second temperature signal is greater than the third threshold value.

* * * * *